(No Model.)
A. D. CATLIN.
MILLING MACHINE FOR SCARFING THE ENDS OF BAND SAWS.
No. 377,707. Patented Feb. 7, 1888.
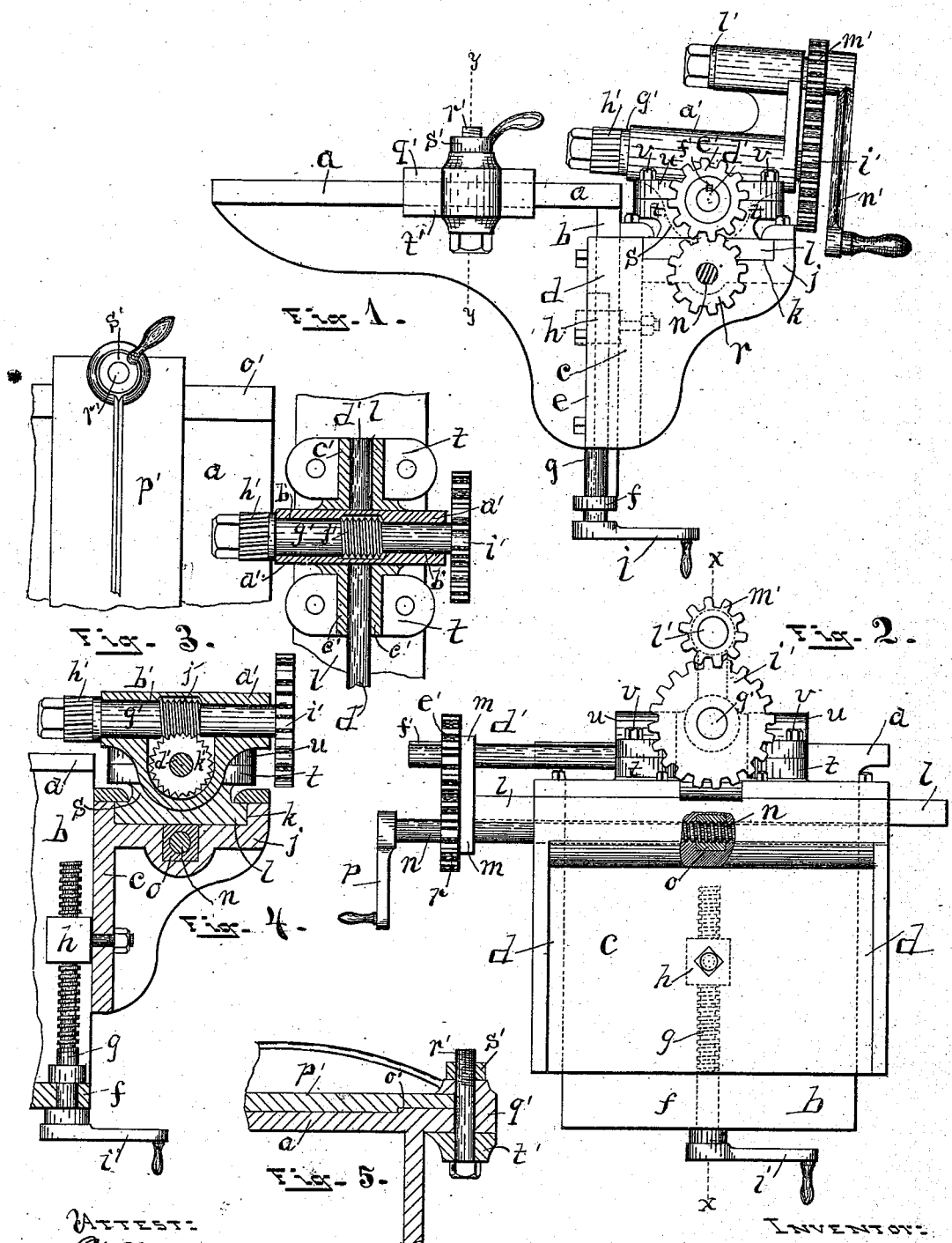

UNITED STATES PATENT OFFICE.

ABEL D. CATLIN, OF BAY CITY, MICHIGAN, ASSIGNOR TO THE CHATTANOOGA MACHINERY COMPANY, OF CHATTANOOGA, TENNESSEE.

MILLING-MACHINE FOR SCARFING THE ENDS OF BAND-SAWS.

SPECIFICATION forming part of Letters Patent No. 377,707, dated February 7, 1888.

Application filed June 10, 1887. Serial No. 240,937. (No model.)

*To all whom it may concern:*

Be it known that I, ABEL D. CATLIN, a citizen of the United States, residing at Bay City, in the county of Bay and State of Michigan, have invented certain new and useful Improvements in Saw-Scarfing Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in machines for scarfing the ends of band-saws in order to form thereon a suitable lap for joining the ends permanently together by brazing, and forming a continuous or endless plate which will be of an even and uniform thickness. This operation is usually performed by means of a file, the end of the saw being secured in some manner and then filed to form a beveled portion upon each end, the bevels being upon opposite sides of the ends, so that when the beveled ends are passed by each other the beveled portion forms a proper holding-surface for the brazing to secure the ends together in a strong and durable manner; but by forming the bevels in this manner a great amount of time is consumed in order to form the parts nearly true or correct, and in some cases a very uneven joint is formed because of haste and negligence, and often the plates are somewhat sprung or warped, which renders the operation extremely difficult and troublesome. Besides, this mode of performing the scarfing operation is very expensive, as at least one or two files are usually entirely used up by each end of the saw; and the objects of my invention are to reduce the time and expense attending the scarfing operation, and to form a true and even joint at all times, and to give both ends of the plate absolutely true and the same inclined or beveled surfaces, so that a true and perfect joint will be obtained which will be stronger and give better working results; and my invention consists, chiefly, in a table or bed provided with devices for clamping one end of the saw and a shaft carrying a rotary cutter which extends over the end of the bed or table and of the clamped end of the saw, and devices for adjusting the cutter to form any desired angle or bevel on the saw-plate, and devices for feeding the cutter forward, and in devices whereby the cutter may be adjusted to form an edge on the scarfed end of any desired thickness, and in the combination and arrangement of the several elements or portions of the machine.

My invention is illustrated in the accompanying drawings, in which—

Figure 1 is a side view of my improved machine. Fig. 2 is a front view of the same. Fig. 3 is a plan view of a portion of the machine, showing horizontal sections of parts carrying cutter-shaft and feeding-shaft. Fig. 4 is a vertical central section of Fig. 2. Fig. 5 is a section showing one side portion of the bed-plate and clamping device.

$a$ represents a table or horizontal bed-plate, which is secured to the end of a suitable supporting table or bench, and is provided with a vertical portion or plate, $b$, extending downward from the end of the bed-plate. In front of the vertical plate $b$ is placed a vertical plate, $c$, secured to the plate $b$ by portions $d$, reaching over the edges of the plate $b$, and pieces $e$, bolted to the portions $d$ and extending in rear of the edges of the plate $b$ and allowing the plate $c$ to slide vertically. In the central portion of the plate $b$ is a recess, into which, and through a forward-extending portion, $f$, is placed a vertical screw, $g$, which also passes through and engages with a nut, $h$, secured rigidly to the plate $c$. The lower end of the screw $g$ is provided with a handle, $i$, with which to operate the screw, and by turning the screw the plate $c$ is raised or lowered, as desired.

$j$ is a bed-plate extending horizontally forward from the upper edge of the plate $c$, and is provided with a transverse groove, $k$, into which is fitted a sliding plate, $l$, which extends to some distance on each side of the bed-plate, and is provided with a piece, $m$, projecting downward from one end of the plate, and through this piece is passed a horizontal screw, $n$, which also passes through a nut, $o$, which is rigidly secured to the plate $j$. The outer end of the screw is provided with a crank, $p$, and a gear-wheel, $r$, by means of which the screw is revolved and the plate moved right or left in the groove, as desired. To the upper side of, and extending upward from the central portion of the sliding plate $j$, is rigidly secured a support, $s$, provided with trunnion-bearings $t$ on its upper side and with cap-pieces $u$, secured to the bearings $t$ by the screw-bolts $v$.

$a'$ is a box having a central shaft-opening, $b'$, and is placed between the trunnion-bearings $t$, and transversely with the sliding plate $l$, and is provided below the center of the opening $b'$ with laterally-extending trunnions $c'$ resting in the bearings $t$. These trunnions $c'$ are provided with a central opening through which is passed the shaft $d'$, and which also extends through and is held in position by the upward projecting portion of the piece $m$. And upon the outer end of the shaft $d'$ is placed a gear-wheel, $e'$, which intermeshes with the gear-wheel $r$ and is held rigid upon the shaft by a feather, $f'$, which allows the wheel to be moved upon the shaft and disengaged from the wheel $r$.

Passed through the opening $b'$ in the journal-box $a'$ is a shaft, $g'$, the inner end of which is provided with a rotary cutter, $h'$, extending over the edge of the bed-plate $a$, and the opposite or outer end of the shaft extending beyond the box is provided with a gear-wheel, $i'$. On the central portion of the shaft $g'$ is a worm, $j'$, and directly below the worm and rigidly secured upon the shaft $d'$ is a worm gear-wheel, $k'$, which engages with the worm $j'$.

Above and parallel with the shaft $g'$ is located a short counter-shaft, $l'$, provided with a pinion, $m'$, intermeshing with the wheel $i'$, and is also provided with a crank, $n'$, which gives motion to the shaft and wheels and revolves the cutter by hand-power; or a pulley may be attached to the outer end of one of the shafts $l'$ or $g'$, and other power used. The surface of the table or bed-plate $a$ is provided with portions, $o'$, on each side slightly raised above the surface and planed true and straight and which are arranged to be at right angles with the sliding plate $l$, and above the bed-plate is placed a clamping-piece, $p'$, provided with a portion, $q'$, at each end reaching over the edges of the bed-plate, and screw-bolts $r'$ are passed through the portions $q'$ and provided with portions $t'$, reaching beneath the edges of the bed-plate and lever-nuts $s'$ above the portions $q'$.

In practice the saw-plate is placed upon the bed-plate $a$, with its rear edge against one of the guide-pieces $c$ and with its end edge even with the front edge of the table, and is then firmly secured in position by the clamping-piece $p'$ and bolts $r'$. The sliding plate $l$ is then moved by operating the screw $n$ to bring the rotary cutter $h'$ to the left of the end of the saw-plate, and the gear-wheel $e'$ is moved to engage with the gear-wheel $r$. The screw-bolts $v$ are then loosened and the supporting-box $a'$ and trunnions $c'$ turned until the cutter has acquired the proper incline to form the desired bevel upon the end of the saw-plate, and the bolts are then tightened until the cap-pieces $u$ hold the trunnions rigidly in position. The screw $g$ is then operated to adjust the cutter to cut the edge of the saw-plate to a thin or sharp edge. The crank $n'$ is then operated, revolving the cutter-shaft $g'$ and cutter $h'$, the worm $j'$ revolving the gear $k'$ and shaft $d'$, which, by means of the gear-wheels $r$ and $e'$, revolves the screw $n$ and moves the sliding plate $l$ and the rotary cutter to the right, and the cutter operating upon the saw-plate forms a true and perfect beveled portion thereon, which operation being completed the gear-wheel $e'$ is moved outward and disengaged from the gear $r$, and the screw $n$ is then revolved by the crank $p$ to move the plate $l$ and rotary cutter again to the left of the saw. The saw is then released and removed and the opposite end is placed in the same position and secured, and the gear-wheels $e'$ and $r$ again engaged, and the cutter again operated to form a beveled portion upon this end of the saw, which will be similar in all respects and dimensions to the first end operated upon, so that when the ends are overlapped for brazing, in the usual manner, they will form a joint of true and even thickness, which can be secured in the best and most substantial manner.

Having fully described my invention, what I claim as new, and desire to secure by Letters Patent, is—

1. The combination, in a saw-scarfing machine, of a saw-supporting table provided with devices for clamping the saw to the table, and a shaft set at an incline with the table and carrying a rotary cutter reaching over the table, with a supporting journal-box carrying the shaft and provided with a tilting adjustment, whereby the incline of the cutter and shaft may be changed, substantially as and for the purpose herein set forth.

2. The combination, in a saw-scarfing machine, of the saw-supporting table provided with raised guide-pieces and having devices for clamping the saw to the table, with a forward-extending table capable of a vertical adjustment and provided with and supporting a laterally-sliding plate, a journal-box supported by the sliding plate and provided with a tilting adjustment, and a cutter-shaft journaled within the box and provided with a rotary cutter reaching over the saw-supporting table and with its cutting-edges set at an angle with the surface of the table, substantially as set forth.

3. The combination, in a saw-scarfing machine, of a saw-supporting table provided with saw-clamping devices, and a shaft carrying a rotary cutter reaching over the table, with a supporting-box carrying the shaft and provided with a tilting adjustment, substantially as and for the purpose set forth.

4. The combination, in a saw-scarfing machine, of the saw-supporting table and the saw-clamping device, with a forward-extending table provided with a transverse groove and having a vertical adjustment, a sliding plate within the groove and provided with a lateral adjustment, a box having a tilting adjustment and supported by the sliding plate, a shaft passed through the box and provided with a rotary cutter, and devices rotating the shaft, substantially as and for the purpose set forth.

5. The combination, in a saw-scarfing machine, of a saw-supporting table provided with saw-clamping devices, a shaft set at an incline with the surface of the table and carrying a rotary cutter reaching over the table and provided with a worm-thread, and a box carrying the cutter-shaft and provided with a tilting adjustment, with a sliding plate supporting the box, a feeding-screw secured to the sliding plate and engaging with a rigid nut, and provided on its outer end with a gear-wheel, and a shaft having on one end a gear-wheel engaging with the worm on the cutter-shaft and on its opposite end a gear-wheel engaging with the gear-wheel on the feeding-screw, substantially as and for the purpose set forth.

6. The combination, in a saw-scarfing machine, of the saw-supporting table provided with devices for clamping the saw, a forward-extending table having a transverse groove and provided with a vertical adjusting-screw, a sliding plate within the groove and provided with a horizontal feeding-screw and provided on its upper side with trunnion-bearings, and a box provided with a longitudinal shaft-opening and having trunnions extending laterally from its sides and secured in the trunnion-bearings, with a shaft within the box and carrying a rotary cutter extending over the supporting-table and provided with a worm-thread, a shaft passed through the center of the trunnions and provided with a wheel having teeth engaging with the worm-thread and having upon its outer end a gear-wheel engaging with a gear-wheel upon the feeding-screw, substantially as and for the purpose herein set forth.

7. The combination, in a saw-scarfing machine, of the table a, provided with the side guides, o', and having a downward-extending portion, b, the vertical plate c, in front of and adjustably secured to the portion b, and having a horizontal plate, j, projecting forward and provided with a groove, k, a sliding plate, l, within the groove, a support, s, secured to the upper side of the plate and provided with the trunnion-bearings t, the cap-pieces u, and screw-bolts v, with a box, a', having a shaft-opening, b', and provided with the laterally-projecting trunnions c', resting in the bearings t, a shaft, g', within the opening b', and provided with the cutter h', and a feeding-screw, n, secured to the plate l, and engaging with the nut o, and the crank p on the feeding-screw, substantially as and for the purpose set forth.

In testimony whereof I affix my signature in presence of two witnesses.

ABEL D. CATLIN.

Witnesses:
   JAS. E. THOMAS,
   GEORGE P. THOMAS.